Oct. 20, 1925.  1,558,279
H. POST
METHOD OF PREPARING FURS
Filed Feb. 8, 1923  3 Sheets-Sheet 1
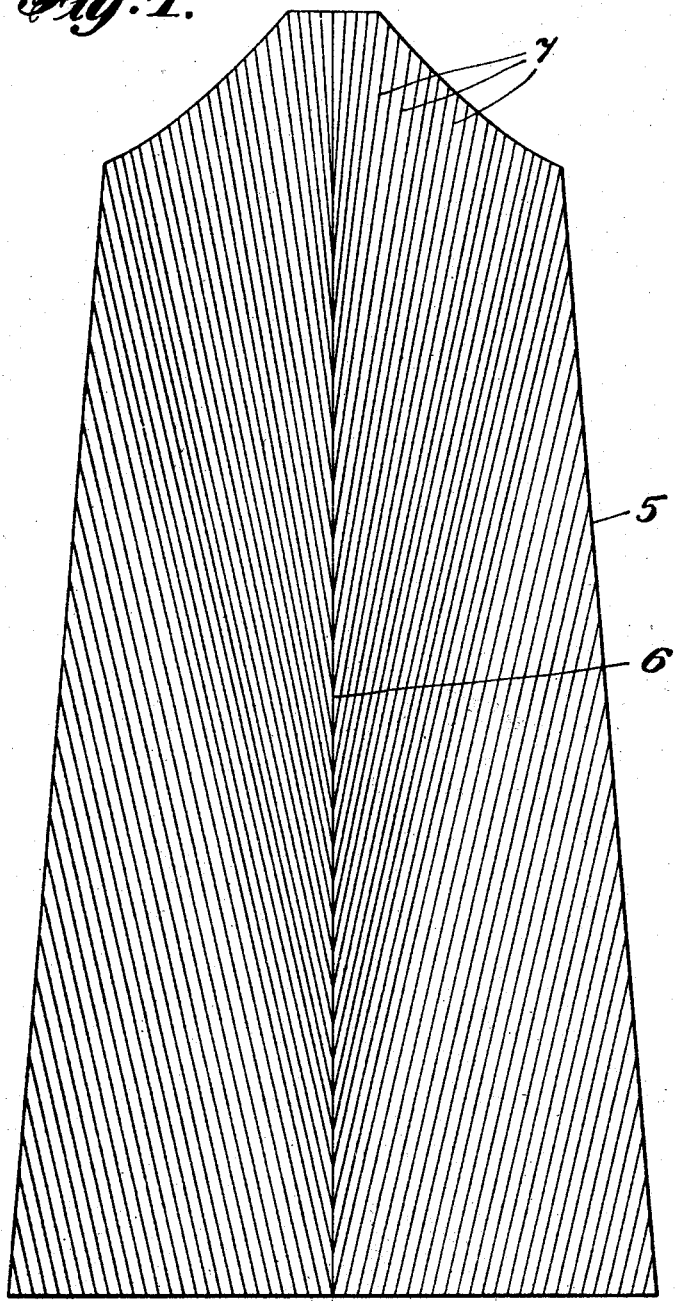
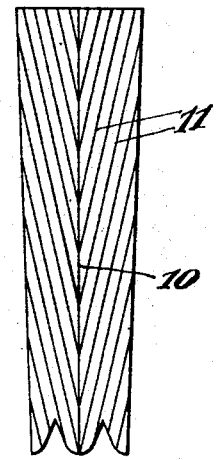
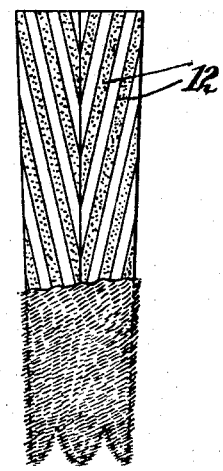
Inventor
Harry Post
By his Attorney C. P. Goebel

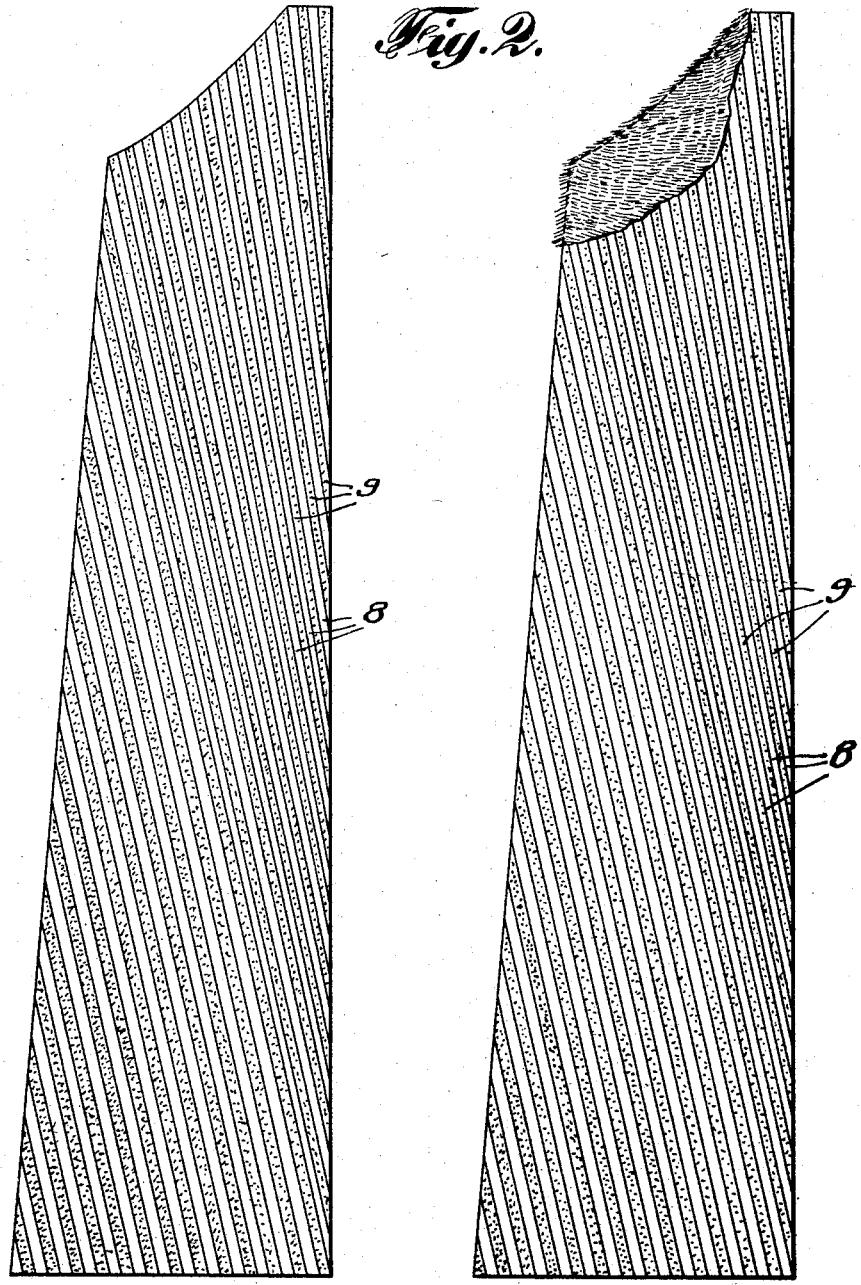

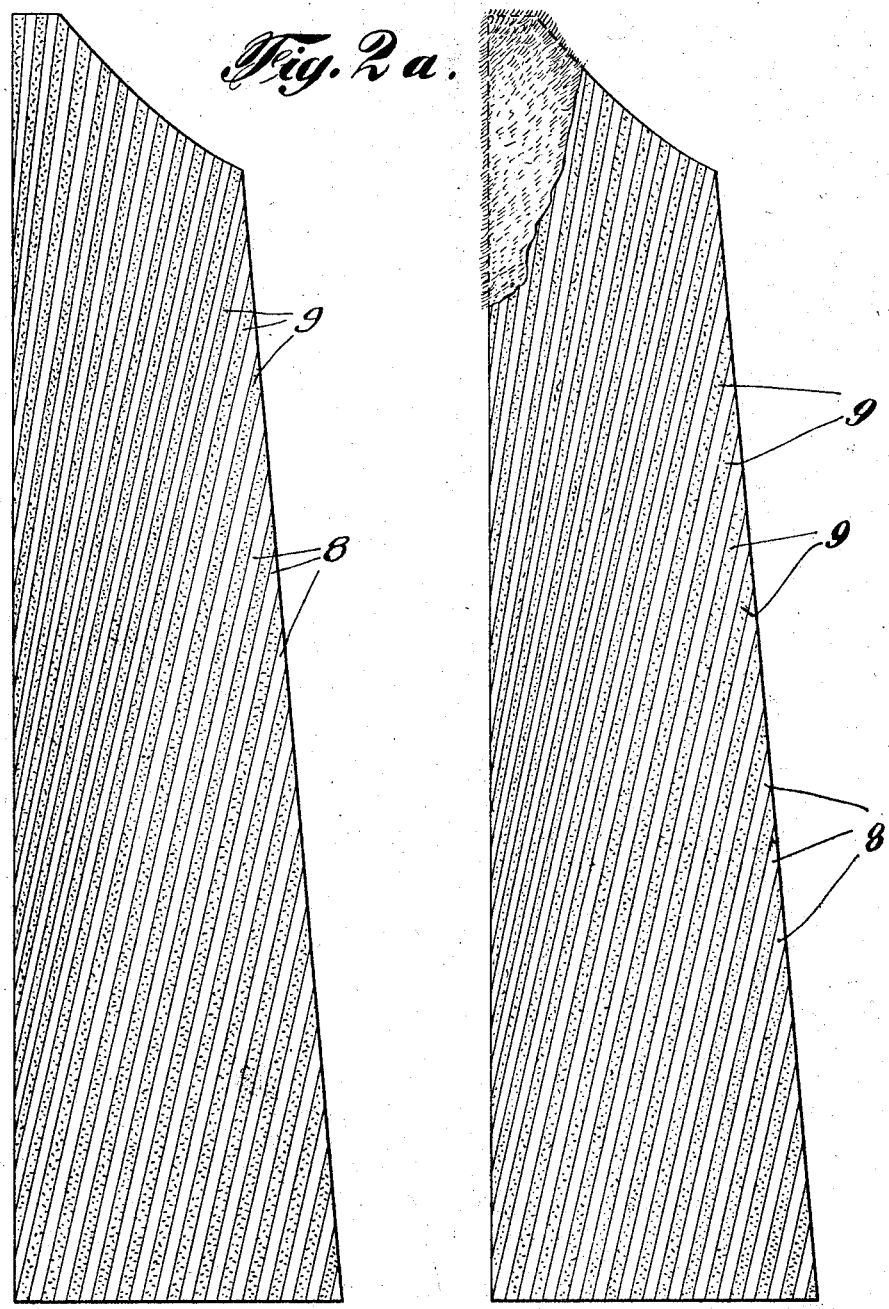

Patented Oct. 20, 1925.

1,558,279

UNITED STATES PATENT OFFICE.

HARRY POST, OF NEW YORK, N. Y.

METHOD OF PREPARING FURS.

Application filed February 8, 1923. Serial No. 617,707.

*To all whom it may concern:*

Be it known that I, HARRY POST, a citizen of the United States, and a resident of New York city, county of New York, and State of New York, have invented certain new and useful Improvements in Methods of Preparing Furs, of which the following is a specification.

This invention relates to fur manufactures and more particularly to an improved method of making neck scarfs and other wearing apparel from natural animal fur, said method comprehending certain novel procedural steps which I shall hereinafter fully described, whereby from the fur bearing skin of a single animal I am enabled to produce two complete neck scarfs, whereas heretofore it has been possible to make only one scarf from each animal skin. Moreover, not only do I, by means of my new method, thus double the commercial value of each natural animal skin, but in many respects the appearance of the completed scarf or other article of apparel surpasses that of the same article made from the unaltered animal skin in accordance with the usual practice in the art.

With the above and other objects in view, the invention consists in the several novel features to which I shall presently refer and then subsequently define in the appended claims.

In the drawings wherein I have more or less diagrammatically illustrated the several steps of my new method:

Figure 1 is a plan view of the original animal skin after it has been longitudinally cut and opened out flat from its tubular form;

Figures 2 and 2ª are similar views showing another step in the method whereby each half of the original skin is converted into two similar halves of the original size and shape; and Figures 3 and 4 are views illustrating the application of the present method to the making of the paws from the original animal's paw for subsequent attachment to the body of the scarf.

Referring first to Figure 1 of the drawings, I have shown an animal skin generally indicated by the numeral 5, the flesh side of the skin or hide only being visible. On its opposite side the skin or hide bears the fur of the animal. My new method is particularly advantageous in the manufacture of neck scrafs of fox pelts, though it may be used also with equal satisfaction with the pelts of other long haired animals. With slight modifications it can also be employed in the manufacture of articles of mink or other short haired animals.

After removing the head, paws and tail from the original pelt, it is cut or slit longitudinally on the under or belly side throughout its length, care being taken to cut only through the skin or hide without clipping the fur. The skin is then opened out flat as seen in Figure 1, and upon the flesh side of the skin a guide line is marked longitudinally and centrally thereof, as shown at 6. This line divides the skin into two half sections of similar shape and area. Each of these sections of the skin is then cut up into a large number of narrow strips. I have secured the best results by cutting the skin along oblique lines as shown at 7, extending from the narrower end of the skin or pelt and from its longitudinal side edge inwardly in converging relation to the central longitudinal line 6. The skin or pelt is then cut along the lines 6 and 7, care being taken to maintain the two halves of the original pelt thus subdivided, separate from each other. The narrow strips 8 of the original skin each carries on one side thereof its complement of hair or fur.

The strips 8 of each half section of the pelt or skin are now spread apart or separated, the alternate strips being removed and separately assembled in separated relation to each other, as shown in Figures 2 and 2ª, thus two series of the spaced strips of the original fur bearing skin are provided and between these spaced strips, the narrow strips 9 of leather or other equivalent flexible material are arranged. By means of a suitable machine, the strips of leather and fur bearing skin are now sewed together along their meeting edges. In this manner it will be seen that each of the original half sections has been converted into two similar half sections of substantially the same shape and area. One of the left and one of the right sections shown in Figures 2 and 2ª respectively, are now brought together, such assembled sections corresponding to the original animal skin shown in Figure 1 and said assembled sections are secured together along their meeting longitudinal edges, thus producing a complete skin which is of the same size and in some cases, may be slightly larger than the original animal skin. The other left and right hand sections having the inserted leather strips 9 are then brought together and secured along their meeting edges in a similar manner. There is thus obtained two complete skins. The outer or side edges of each of these manufactured skins are then brought together and connected by suitable stitching so that the skin will again be in its original tubular form. The long hair or fur on one side of the strips of the natural animal skin or hide 8 completely covers the interposed strips of leather or other material 9 so that the latter are not visible. It has also been found that as a result of this method the fur has a glossier and more attractive appearance. To the non-expert observer, it is impossible to discern any substitution or addition of foreign material to the original skin. It is therefore, possible for a manufacturer to produce and sell articles made in accordance with the new method which I have devised at a retail price to the purchaser which is below that at which a similar article made from the unaltered natural animal pelt could be profitably sold, though notwithstanding this fact both the manufacturer and retailer would realize an increased profit.

The same method as above described, is applicable in the preparation of the animal paws or ears for application to the body of the article. Thus as I have shown in Figures 3 and 4 of the drawings, each of the paws after it is flattened out is cut into two halves along the longitudinal center line 10 and then each half divided into a plurality of narrow strips and cut along the lines 11. Strips of each half are then arranged in two series separated from each other and the leather strips 12 inserted therebetween. The strips are then sewed to each other and the right and left sections connected and their outer edges brought together and stitched in the same manner as was previously done with the body of the animal skin so that from the one natural animal paw, two paws of the same identical appearance as the original paw, are produced. The paws and ears are then properly applied to the body of the article, and the head and tail are also connected thereto in accordance with the usual well known practice in the art.

While I have herein referred to my method as particularly adapted for the making of neck scarfs, it is apparent, of course, that the same method is applicable in the manufacture of various other garments or articles of wearing apparel from animal furs. Accordingly, it is to be understood that I reserve the privilege of utilizing my improved method for all other analogous purposes to which it might be advantageously adapted. Further, my present improvements are not necessarily limited to the exact details of procedure herein set forth and I reserve the privilege of resorting to all such legitimate changes as may be fairly considered within the spirit and scope of the invention as claimed.

I claim:

1. In the art of fur manufacturing, the method which consists in cutting a fur bearing animal pelt longitudinally, then separating the pelt by a second longitudinal cut into half sections, then dividing each of said sections into a plurality of narrow strips by parallel diagonal cuts, assembling the strips of each section into two series in separated relation to each other, inserting strips of flexible material between the separated pelt strips in each series, sewing the pelt strips and the inserted strips to each other to thereby produce two similar half sections of a whole animal skin each substantially corresponding in area with the original half section, and finally assembling right and left half sections each containing the inserted strips and sewing the same to each other along the longitudinal edges thereof in the form of the original natural animal pelt.

2. In the art of fur manufacture, the method which consists in dividing a natural animal pelt into right and left half sections, then cutting each half section of the pelt along oblique lines between its longitudinal edges into relatively narrow strips, then separating the strips of each half section into two separate series and inserting leather strips between the separated pelt strips in each series to thereby produce two similar half sections each substantially corresponding in area to the original half section of the pelt, and finally assembling right and left half sections having the inserted leather strips and connecting the same to each other along their longitudinal edges in substantially the same size and form as the original whole animal pelt.

3. In the art of fur manufacture, the method which consists in cutting animal pelt having the natural fur on one side thereof into a plurality of narrow strips or sections, removing every other strip and inserting therebetween strips of flexible material of substantially the same width as that of the strips of fur, whereby the fur entirely covers and conceals the inserted strips.

4. In the art of fur manufacture, the method which consists in cutting an animal pelt having the natural fur on one side thereof into a plurality of strips or sections, removing every other strip and assembling them in spaced relation and inserting therebetween strips of flexible material and sewing the pelt strips and inserted strips to each other along their meeting edges.

5. In the art of fur manufacture, the method which consists in cutting an animal pelt having the natural fur on one side thereof into a plurality of obliquely arranged strips or sections, removing every other strip and inserting therebetween strips of flexible material and then sewing the pelt strips and the inserted strips to each other along their meeting edges.

In testimony that I claim the foregoing as my invention, I have signed my name hereunder.

HARRY POST.